US012731836B2

(12) United States Patent
Yasui et al.

(10) Patent No.: US 12,731,836 B2
(45) Date of Patent: Sep. 8, 2026

(54) MOBILE BATTERY DEVICE, CONNECTABLE ELECTRIC EQUIPMENT, AND MOBILE ELECTRIC DEVICE

(71) Applicant: ELECOM CO., LTD., Osaka (JP)

(72) Inventors: Akira Yasui, Osaka (JP); Yoshinori Okada, Osaka (JP); Yuki Yamame, Osaka (JP)

(73) Assignee: Elecom Co., Ltd., Osaka (JP)

( * ) Notice: Subject to any disclaimer, the term of this patent is extended or adjusted under 35 U.S.C. 154(b) by 695 days.

(21) Appl. No.: 18/009,085

(22) PCT Filed: Jun. 29, 2022

(86) PCT No.: PCT/JP2022/025885
§ 371 (c)(1),
(2) Date: Dec. 8, 2022

(87) PCT Pub. No.: WO2023/286597
PCT Pub. Date: Jan. 19, 2023

(65) Prior Publication Data
US 2024/0234880 A1 Jul. 11, 2024

(30) Foreign Application Priority Data
Jul. 16, 2021 (JP) ................................ 2021-118276

(51) Int. Cl.
*H01M 50/141* (2021.01)
*H01M 50/107* (2021.01)
*H01M 50/543* (2021.01)

(52) U.S. Cl.
CPC ....... *H01M 50/141* (2021.01); *H01M 50/107* (2021.01); *H01M 50/543* (2021.01); *H01M 2220/30* (2013.01)

(58) Field of Classification Search
CPC ............ H01M 50/141; H01M 50/107; H01M 50/543; H01M 50/247; H01M 50/296;
(Continued)

(56) References Cited

U.S. PATENT DOCUMENTS 4,203,150 A 5/1980 Shamlian
2004/0013938 A1 1/2004 Murashige et al.
(Continued)

FOREIGN PATENT DOCUMENTS

CN 1478634 A 3/2004
EP 0870975 A2 10/1998
(Continued)

*Primary Examiner* — Joshua L Allen
(74) *Attorney, Agent, or Firm* — The Webb Law Firm

(57) ABSTRACT

Provided is a mobile battery device including a body case having a housing space for housing a battery. The body case includes, at certain places a battery-side terminal that serves as an output terminal of the battery; and a battery-side connection part that is connectable to an electric equipment-side connection part of an electric equipment that operates by receiving power of the battery. The electric equipment-side connection part includes an equipment-side terminal that is electrically connectable to the battery-side terminal. The battery-side connection part includes, a battery-side slip-out prevention part for forming a slip-out prevention structure at a connection portion between the battery-side connection part and the equipment-side connection part; and a battery-side water-stop part for forming a water stop structure at the connection portion between the battery-side connection part and the equipment-side connection part.

3 Claims, 8 Drawing Sheets

(58) Field of Classification Search

CPC ............... H01M 50/50; H01M 50/202; H01M 2220/30; H02J 7/0042; Y02E 60/10; H05K 5/02

See application file for complete search history.

(56) References Cited

U.S. PATENT DOCUMENTS

| | | | | |
|---|---|---|---|---|
| 2006/0180689 | A1 | 8/2006 | Ogino et al. | |
| 2007/0258236 | A1* | 11/2007 | Miller | F21L 4/027 362/205 |
| 2014/0334138 | A1* | 11/2014 | Jigamian | F21V 31/005 29/745 |
| 2015/0214520 | A1 | 7/2015 | Nishikawa et al. | |
| 2018/0205051 | A1* | 7/2018 | Sakai | H01R 24/005 |
| 2019/0181407 | A1* | 6/2019 | Harris | H02J 7/00308 |
| 2020/0032969 | A1* | 1/2020 | Chen | F21V 23/0428 |

FOREIGN PATENT DOCUMENTS

| | | | | |
|---|---|---|---|---|
| JP | H06176745 | A | 6/1994 | |
| JP | 2006197921 | A | 8/2006 | |
| JP | 2012205371 | A | 10/2012 | |
| JP | 2017168184 | A | 9/2017 | |
| WO | WO-2015039275 | A1 * | 3/2015 | A24F 40/40 |

* cited by examiner

MOBILE BATTERY DEVICE, CONNECTABLE ELECTRIC EQUIPMENT, AND MOBILE ELECTRIC DEVICE

CROSS-REFERENCE TO RELATED APPLICATIONS

This application is the United States national phase of International Patent Application No. PCT/JP2022/025885 filed Jun. 29, 2022 and claims priority to Japanese Patent Application No. 2021-118276 filed Jul. 16, 2021, the disclosures of which are hereby incorporated by reference in their entireties.

BACKGROUND OF THE INVENTION

Field of the Invention

The present invention relates to a mobile battery device, a connectable electric equipment that is connectable to the mobile battery device, and a mobile electric device equipped with the mobile battery device and the connectable electric equipment connectable to the mobile battery device.

Description of Related Art

The mobile battery device includes a power supply terminal that is exposed on one end surface in a longitudinal direction of a body case for housing a secondary battery and configured to supply power to an electric equipment, and a body cover that is configured to be fitted to one end of the body case in order to close a surface on which the power supply terminal of the body case is provided. The mobile battery device can be used as a flashlight by inserting a cap part into the body cover, the cap part including a connector to be connected to the power supply terminal and an LED that is lit up by the power supplied to the connector (see, for example, Patent Literature 1).

In the aforementioned conventional configuration, the body cover and the cap part are coupled with each other by merely inserting the cap part into the body cover, which sometimes causes the cap part to slip out of the body cover. In particular, when the cap part slips out of the body cover during the outdoor use, water or rainwater may enter the inside of the body case from the body cover, which makes the mobile battery device unusable. Thus, there has been a room for improvement.

CITATION LIST

Patent Literature

Patent Literature 1: JP 2012-205371 A

SUMMARY OF THE INVENTION

Technical Problem

In view of the aforementioned circumstances, an object of the present invention is to provide a mobile battery device, a connectable electric equipment, and a mobile electric device which can prevent the penetration of water.

Solution to Problem

A mobile battery device of the present invention includes a body case having a housing space for housing a battery, the body case including, at certain places: a battery-side terminal that serves as an output terminal of the battery; and a battery-side connection part that is connectable to an electric equipment-side connection part of an electric equipment that operates by receiving power of the battery, the electric equipment-side connection part including an equipment-side terminal that is electrically connectable to the battery-side terminal, the battery-side connection part including: a battery-side slip-out prevention part for forming a slip-out prevention structure at a connection portion between the battery-side connection part and the equipment-side connection part; and a battery-side water-stop part for forming a water stop structure at the connection portion between the battery-side connection part and the equipment-side connection part.

A connectable electric equipment of the present invention includes an electric equipment that is connectable to a mobile battery device housing a battery and that operates by receiving power of the battery, the electric equipment including, at a certain place, an electric equipment-side connection part, in which the electric equipment-side connection part is connectable to a battery-side connection part of the mobile battery device, the electric equipment-side connection part includes an equipment-side terminal that is electrically connectable to a battery-side terminal that serves as an output terminal of the battery of the battery-side connection part, and the electric equipment-side connection part includes: an equipment-side slip-out prevention part for forming a slip-out prevention structure at a connection portion between the electric equipment-side connection part and the battery-side connection part; and an equipment-side water-stop part for forming a water stop structure at the connection portion between the electric equipment-side connection part and the battery-side connection part.

A mobile electric device of the present invention includes: a mobile battery device including a body case having a housing space for housing a battery; and a connectable electric equipment including an electric equipment that is connectable to the mobile battery device and operate by receiving power of the battery, in which the body case of the mobile battery device includes, at certain places, a battery-side terminal that serves as an output terminal of the battery, and a battery-side connection part, the electric equipment of the connectable electric equipment includes, at a certain place, an electric equipment-side connection part including an electric equipment-side terminal that is electrically connectable to the battery-side terminal, the battery-side connection part includes: a battery-side slip-out prevention part that is connectable to the electric equipment-side connection part and forms a slip-out prevention structure at a connection portion between the battery-side connection part and the equipment-side connection part; and a battery-side water-stop part for forming a water stop structure at the connection portion between the battery-side connection part and the equipment-side connection part, and the electric equipment-side connection part includes: an electric equipment-side slip-out prevention part for forming the slip-out prevention structure; and an electric equipment-side water-stop part for forming the water stop structure.

DESCRIPTION OF THE INVENTION

Hereinafter, a mobile battery device of the present invention will be described on the basis of FIG. 1 to FIG. 3. The mobile battery device of this embodiment is used as a direct-current power source necessary when connected with an electric equipment for use of the electric equipment. The mobile battery device is mainly used in the outdoor, but can be used inside the room.

Figure 1:
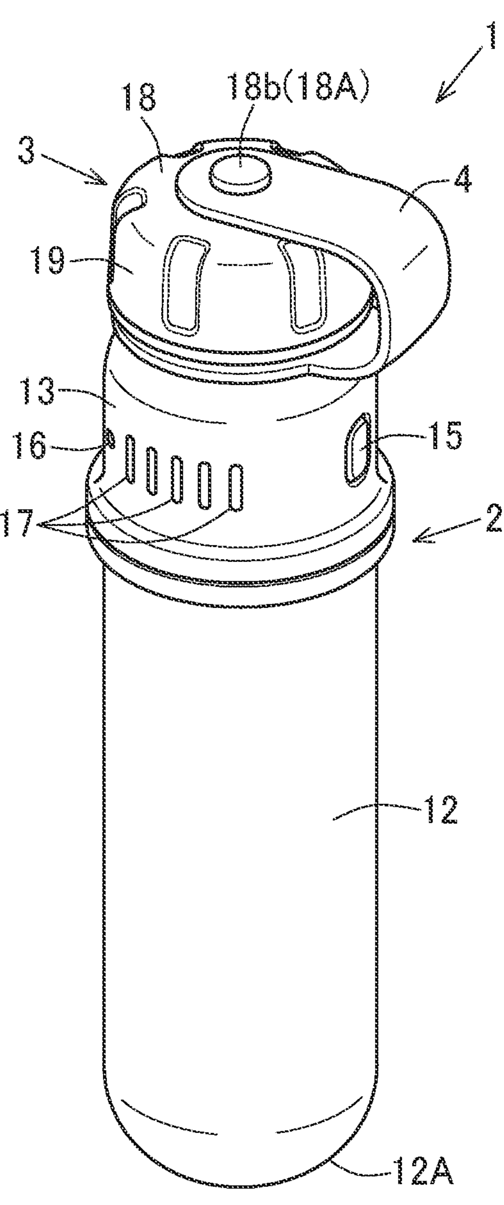
FIG. 1 is a perspective view of a mobile battery device when viewed from diagonally above.
Figure 2:
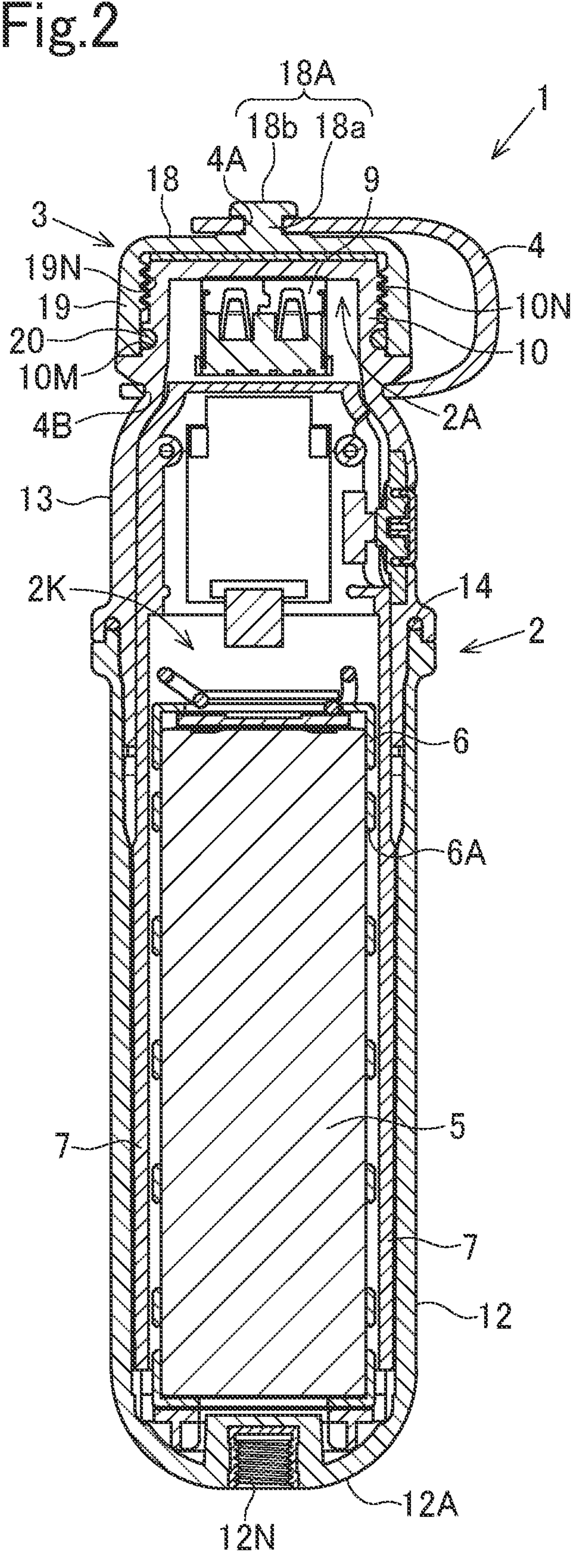
FIG. 2 is a longitudinal sectional view of the mobile battery device.

As shown in FIG. 1 and FIG. 2, the mobile battery device 1 includes a body case 2, and a cap part 3 that is detachably attached to the body case 2 to cover an opening 2A (see FIG. 2) of the body case 2. The mobile battery device 1 further includes a coupling member 4 having one end configured to be attached to the body case 2. The cap part 3 is rotatably coupled to the other end of the coupling member 4. Thereby, it is possible to prevent the cap part 3 from being lost when the cap part 3 is detached from the body case 2. The opening 2A includes two openings 2*a*, 2*b* (see FIG. 3) into which a first USB terminal 8 and a second USB terminal 9 (described later) are inserted to be supported.

The body case 2 is made of a synthetic resin (or can be made of, for example, wood or metal). The body case 2 has a bottomed cylindrical shape elongated in an axial direction and includes a housing space 2K (see FIG. 2) for housing a secondary battery 5. As is also shown in FIG. 3, the secondary battery 5 is covered with a cover member 6 that is made of a silicon resin or formed by a material having an elasticity such as an elastomer resin or a synthetic rubber and that has a large number of holes 6A formed therein. The cover member 6 is configured to moderate impact force applied to the secondary battery 5 to thereby prevent breakage of the secondary battery 5. The cover member 6 covering the secondary battery 5 is additionally covered with a protection case 7 that can be divided in a radial direction into two pieces.

Figure 3:
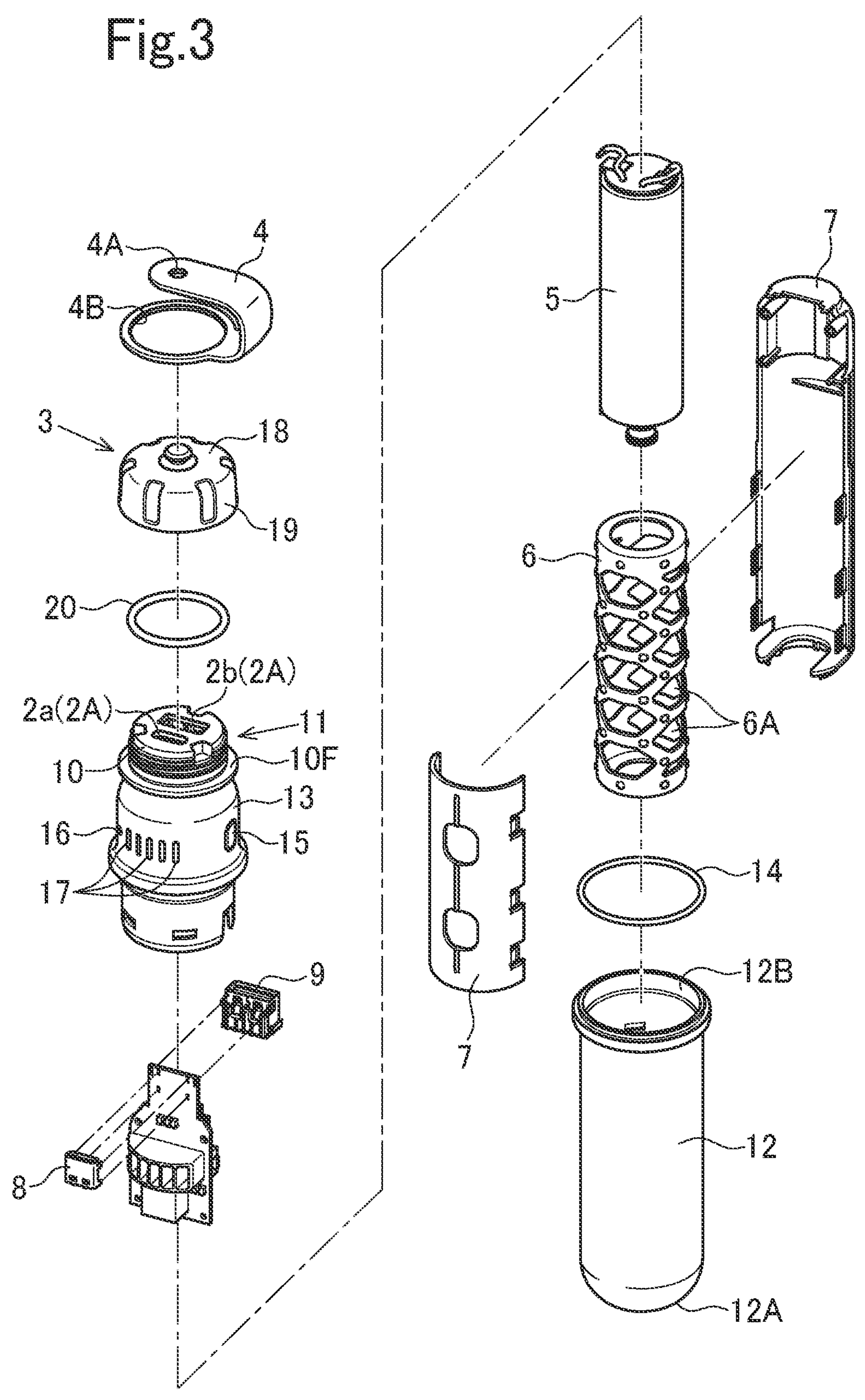
FIG. 3 is an exploded perspective view of the mobile battery device.

As is also shown in FIG. 3, the body case 2 includes a battery-side connection part 11 at a certain position (at one end in a longitudinal direction (i.e., axial direction) as an example of this embodiment). The battery-side connection part 11 has a lateral side wall part 10 protruding upward from an upper surface of a flange 10F formed in the body case 2. The lateral side wall part 10 includes the first USB terminal 8 and the second USB terminal 9 inside thereof. The first USB terminal 8 is an input-output terminal that enables not only the input of the power for charging the secondary battery 5, but also the output of the power of the secondary battery 5 to a connectable electric equipment 21 (see FIG. 5). The second USB terminal 9 is an output terminal for outputting the power of the secondary battery 5 to the connectable electric 10) equipment 21 (see FIG. 5). The first USB terminal 8 and the second USB terminal 9 each are a battery-side terminal. The battery-side connection part 11 is connectable with a USB connector 27 (see FIG. 6) that is an equipment-side terminal of an electric equipment-side connection part 34 to be described later. Various types of power sources such as a handy-type battery or a fordable solar panel are used as an external power source for charging the secondary battery 5.

As shown in FIG. 1 and FIG. 2, the body case 2 includes two case parts (i.e., first case part 12, second case part 13) in the longitudinal direction (i.e., axial direction) of the body case 2. The first case part 12 has a bottomed cylindrical shape with a bottom part 12A having an arc shape. The second case part 13 is fitted and fixed to an opening part 12B of the first case part 12 (see FIG. 3). The body case 2 further includes a seal member 14 at a connection part between the first case part 12 and the second case part 13, the seal member 14 having an annular shape and elasticity for sealing the connection part. The second case part 13 has the lateral side wall part 10 at one end on the opposite side to the first case part 12. The mobile battery device 1 can be configured to be kept in upright position by, for example, a tripod stand through threaded engagement between a screw hole 12N provided at a center (see FIG. 2) of the bottom part 12A and a threaded shaft provided at the central portion of the tripod stand (not shown) to be threaded into the screw hole 12N.

As shown in FIG. 1, the second case part 13 includes a switch 15, a power lamp 16, and a plurality of indicators 17 (5 indicators in FIG. 1). The switch 15 is long pressed to thereby switch the connection state from a connected state, in which the secondary battery 5 and the two USB terminals 8, 9 are electrically connected to each other, to a non-contacted state, in which the secondary battery 5 and the two USB terminals 8, 9 are not electrically connected to each other. Accordingly, the secondary battery 5 is started to be charged or the connectable electric equipment 21 is activated (for example, a light-emitting diode 30 to be described later is lit up) only by the electrical connection between the USB connector 27 of the connectable electric equipment 21 and either one of two USB terminals 8, 9. After the aforementioned connection, when the switch 15 is long pressed for a certain time or more to thereby stop the started charging or turn off the light-emitting diode 30 that is being lit up. At this time, a rotary switch 32 to be described later needs to be kept in an ON state. The plurality of indicators 17 are provided to indicate the residual capacity of the secondary battery 5. In the indicators 17, the more the 10) number of lights, the higher the residual capacity.

The cap part 3 is made of a synthetic resin (or can be made of, for example, wood or metal). As shown in FIG. 2 and FIG. 3, the cap part 3 includes a top part 18 having a circular plate shape, and a skirt part 19 having a cylindrical shape and extending downward from an outer circumferential edge of the top part 18. The top part 18 has a locking part 18A protruding from its upper surface. The locking part 18A locks the other end of the coupling member 4 while the other end passes through the locking part 18A (see FIG. 2). The locking part 18A includes a columnar shaft part 18*a* that passes through a hole 4A formed on the other end of the coupling member 4 and extending upward, and a large diameter part 18*b* that radially extends from the upper end of the shaft part 18*a* and has a larger diameter than the shaft part 18*a*. The large diameter part 18*b* is configured to prevent the other end of the coupling member 4 from slipping out of the shaft part 18*a*. The skirt part 19 has an inner surface provided with a threaded part 19N to be described later. The coupling member 4 has a hole 4B at one end. The one end of the coupling member 4 is attached to the second case part 13 with the second case part 13 passing through the hole 4B.

As shown in FIG. 2, the lateral side wall part 10 has an outer surface provided with a female (or male) threaded part 10N, with which the male (or female) threaded part 19N formed on the skirt part 19 of the cap part 3 can come into threaded engagement. The lateral side wall part 10 includes a water stop structure to stop water between the cap part 3 and the lateral side wall part 10 in a state where the threaded part 19N of the cap part 3 is in threaded engagement with the threaded part 10N of the lateral side wall part 10.

The water stop structure is composed of an annular seal member 20 having a circular shape in a cross section and having elasticity. The seal member 20 is locked by an annular-shaped groove 10M that is formed on the outer surface of the lateral side wall part 10. Accordingly, the cap part 3 is rotated to cause the threaded part 19N of the cap part 3 to be brought into threaded engagement with the threaded part 10N (i.e., battery-side slip-out prevention part to be described later). This treaded engagement enables the seal member 20 to reliably stop water between the cap part 3 and the lateral side wall part 10, while enabling the cap part 3 to be fixed to the lateral side wall part 10 so as not to slip out of the lateral side wall part 10.

Next, the description will be given on a connectable electric equipment 21 that is detachably mounted to the body case.

Figure 8:
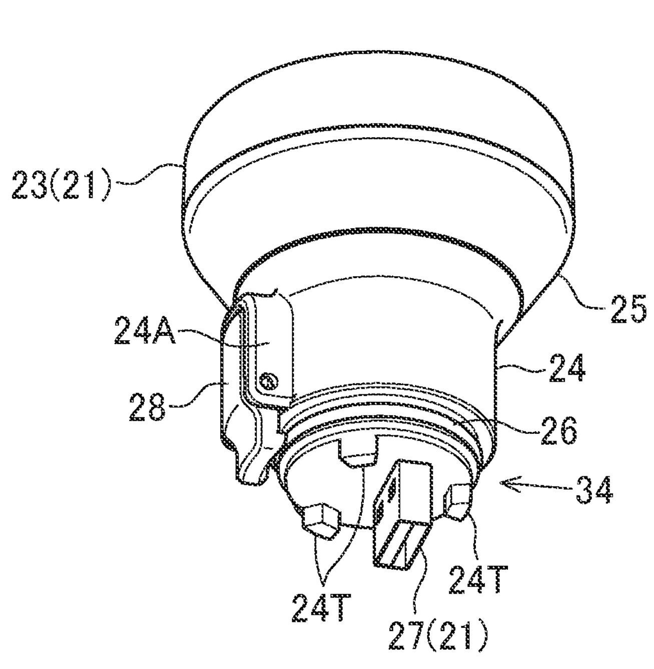
FIG. 8 is a perspective view showing a state immediately before a connectable electric equipment is attached to the mobile battery device.
Figure 8:
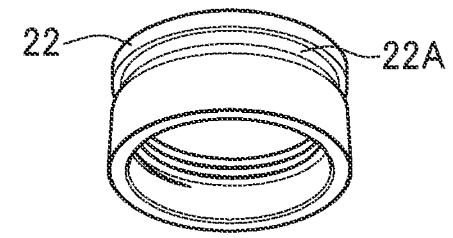
Figure 8:
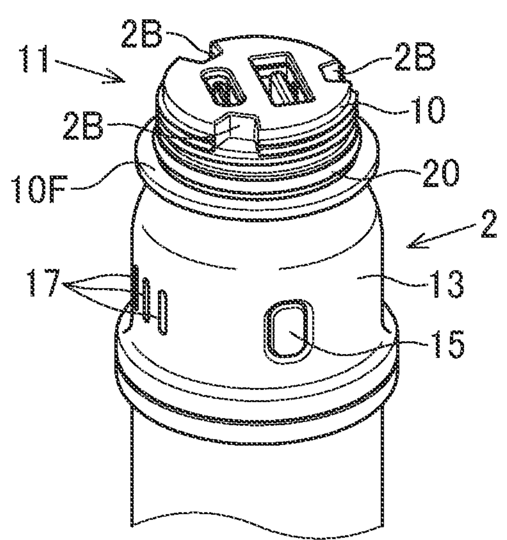

As shown in FIG. 8, the connectable electric equipment 21 includes an electric equipment 23 that operates by receiving power, and an electric equipment-side connection part 34 that has the USB connector 27. The electric equipment-side connection part 34 is connected to a certain place (in the example of this embodiment, one end (a lower end in FIG. 8) of the electric equipment 23). The USB connector 27 is an equipment-side terminal that is electrically connectable to the second USB terminal 9 that is a battery-side terminal of the battery-side connection part 11, and located in the electric equipment-side connection part 34, while protruding downward. The mobile electric device 33 of this embodiment (see FIG. 5) includes a cylindrical relay member 22 for connecting between the battery-side connection part 11 and the electric equipment-side connection part 34. That is, the mobile electric device 33 includes the mobile battery device 1, the connectable electric equipment 21, and the relay member 22 (see FIG. 5). The electric equipment-side connection part 34 is formed by a side wall part that protrudes downward from the lower end of a body part 24 to be described later and having a diameter somewhat smaller than that of the body part 24. The USB connector (i.e., equipment-side terminal) 27 protrudes downward from the electric equipment-side connection part 34. The connectable electric equipment 21 further includes a locking part 28 to be described later, which is an electric equipment-side slip-out prevention part. The locking part 28 is located to face the lateral side of the electric equipment-side connection part 34.

Figure 5:
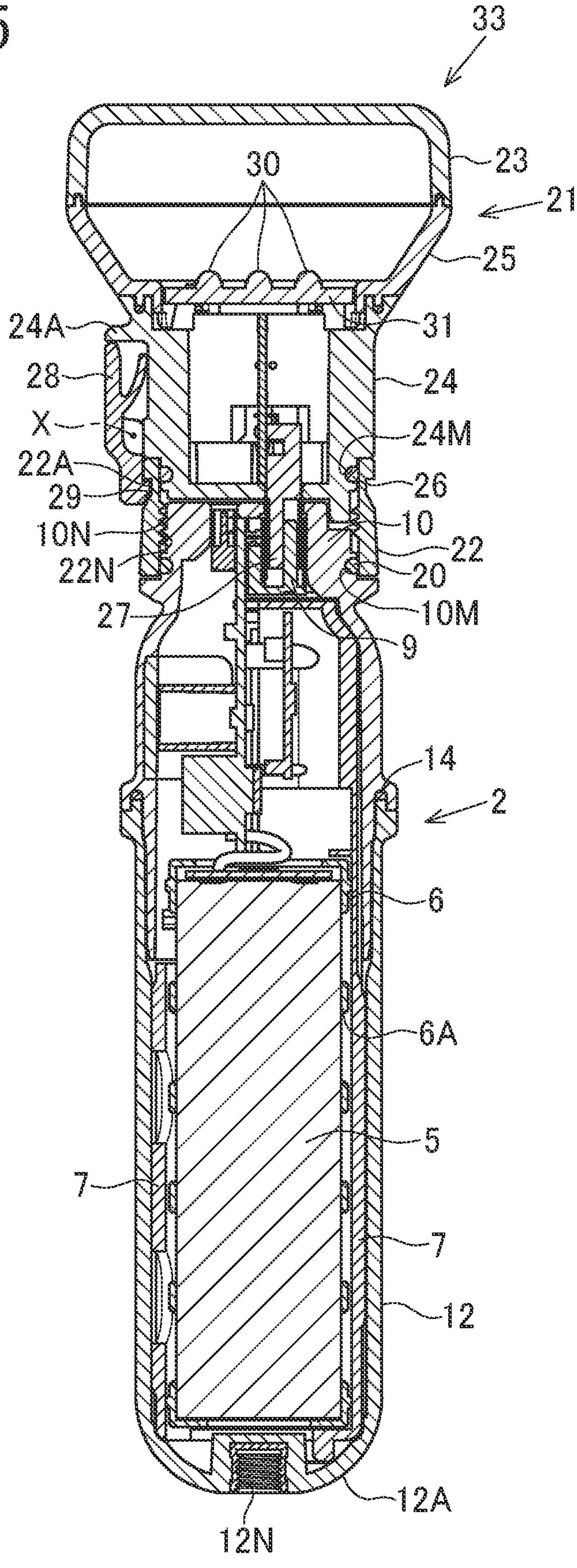
FIG. 5 is a longitudinal sectional view of the mobile electric device.
Figure 6:
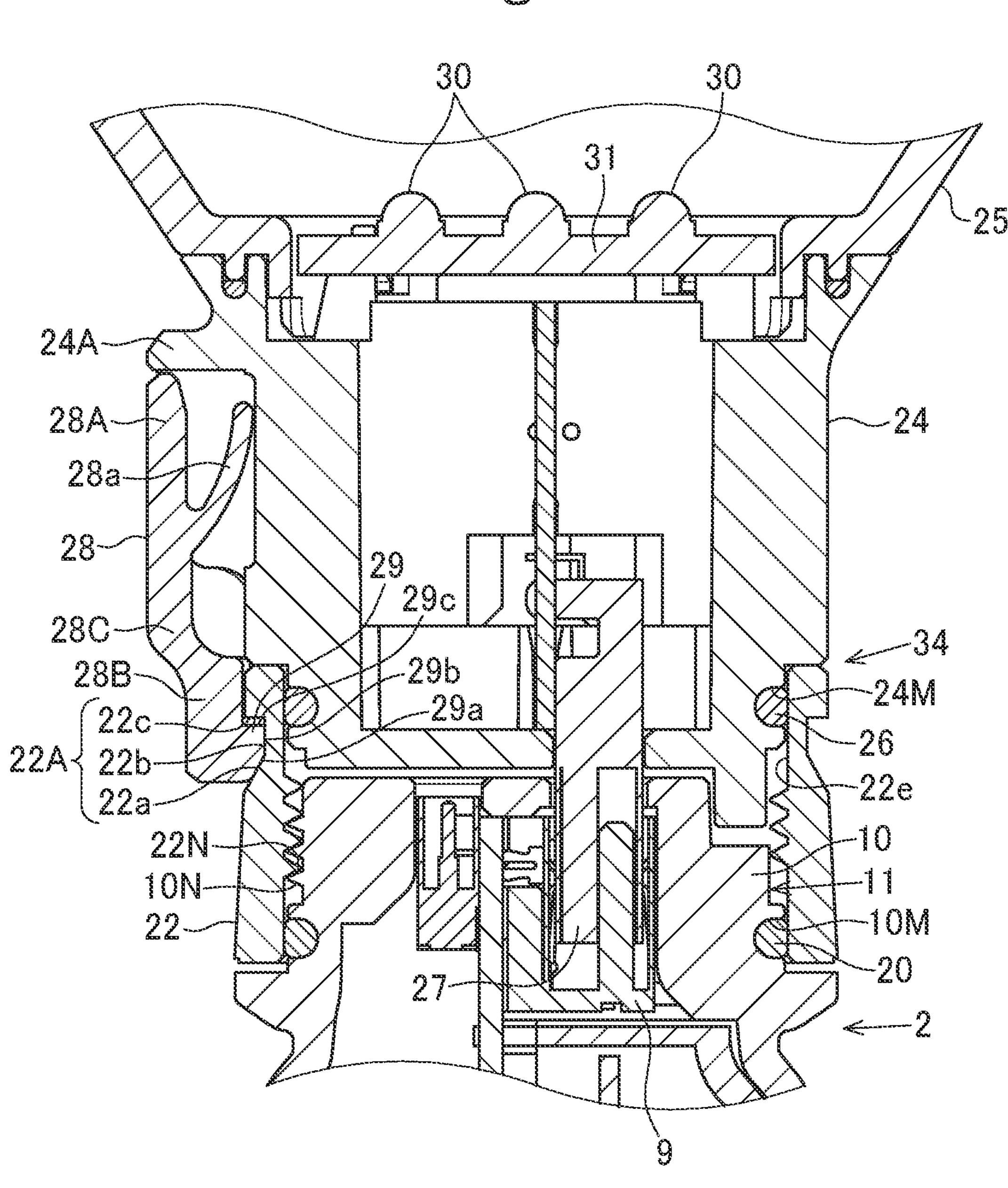
FIG. 6 is an enlarged view of a main part of the mobile electric device in FIG. 5.
Figure 7:
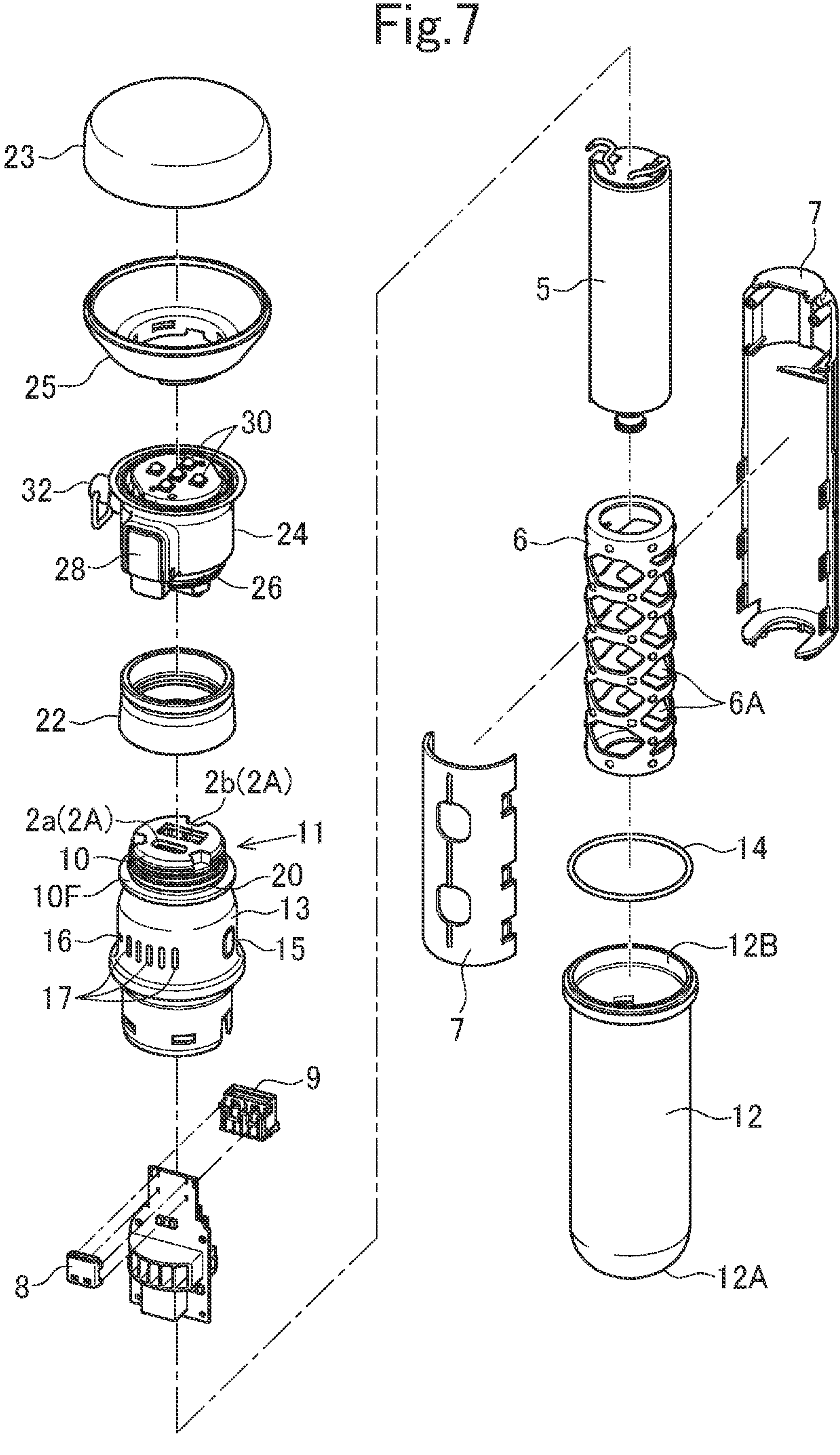
FIG. 7 is an exploded perspective view of the mobile electric device.

The relay member 22 is made of a synthetic resin (or can be made of, for example, wood or metal). As shown in FIG. 5 and FIG. 6, the relay member 22 has an inner surface and an outer surface, the inner surface being provided with a threaded part (i.e., relaying battery-side slip-out prevention part) 22N configured to come into threaded engagement with the threaded part (i.e., battery-side slip-out prevention part) 10N provided on the outer surface of the lateral side wall part 10 of the body case 2, and the outer surface being provided with a locked part (i.e., relaying electric equipment-side slip-out prevention part) 22A configured to be locked by a locking part (i.e., electric equipment-side slip-out prevention part) 28 provided in the electric equipment 23. The locked part 22A is an annular-shaped recess formed on the outer surface on the upper side of the relay member 22. The recess has an inclined surface 22*a* that is located on the lower side of the recess to come close to the inward side in the radial direction toward the upper side, a flat surface 22*b* extending straight upward from the upper end of the inclined surface 22*a*, and a horizontal surface 22*c* extending straight toward the outer side in the radial direction from the upper end of the flat surface 22*b*.

The electric equipment 23 includes a cylindrical body part 24 that is mounted to the upper end of the body case 2 via the relay member, an equipment part 25 that is connected to the upper end while being held in a water stopped state (while being sealed), and that has a larger diameter than the diameter of the body part 24, and the electric equipment-side connection part 34 that extends downward from the lower end of the body part 24 and that is connected to the battery-side connection part 11.

The mobile electric device 33 (see FIG. 5) includes a water stop structure to stop water between the relay member 22 and the body case 2 and between the relay member 22 and the electric equipment 23. Specifically, as shown in FIG. 5 and FIG. 6, the water stop structure includes a seal member (first seal member) 26 having an annular shape in a cross section and having elasticity disposed in an annular groove 24M formed at the upper end of the electric equipment-side connection part 34 of the electric equipment 23, and the seal member (second seal member) 20 having an annular shape in a cross section and having elasticity disposed in the annular groove 10M formed in the lateral side wall part 10. Accordingly, the first seal member 26 is press-contacted to an area between the relay member 22 and the electric equipment-side connection part 34 of the electric equipment 23 to seal between the relay member 22 and the electric equipment-side connection part 34, and the second seal member 20 is press-contacted to an area between the relay member 22 and the battery-side connection part 11 to seal between the relay member 22 and the battery-side connection part 11.

The first seal member 26 is an electric equipment-side water-stop part provided in the electric equipment-side connection part 34 in order to form the water stop structure at a connection portion between the battery-side connection part 11 and the electric equipment-side connection part 34. A relaying electric equipment-side water-stop part that engages or abuts with the first seal member (i.e., electric equipment-side water-stop part) 26 to form the water stop structure is a surface (area) on the upper side of an inner side surface 22*e* of the relay member 22 (see FIG. 6). The second seal member 20 is a battery-side water-stop part provided in the battery-side connection part 11 in order to form the water stop structure at a connection portion between the electric equipment-side connection part 34 and the battery-side connection part 11. A relaying battery-side water-stop part that engages or abuts with the second seal member (i.e., battery-side water-stop part) 20 to form the water stop structure is a surface (area) on the lower side of the inner side surface 22*e* of the relay member 22.

As shown in FIG. 8, the electric equipment-side connection part 34 includes the USB connector 27 that is fixed to the bod part 24, while protruding downward from the lower end of the body part 24. The USB connector 27 is an equipment-side terminal configured to be inserted into the second USB terminal 9 so as to be electrically connectable to the second USB terminal 9. The electric equipment-side connection part 34 includes protrusions 24T at 3 places in a peripheral direction on the peripheral edge of the lower end. The protrusions 24T have a substantially trapezoidal shape in a bottom view and fit in and locked by recesses 2B having a substantially trapezoidal shape in plan view that are recessed radially inward and formed at 3 places in the peripheral direction on the upper end of the lateral side wall part 10 (i.e., battery-side connection part 11) of the body case 2. Accordingly, the protrusions 24T of the body part 24 are locked to the recesses 2B of the lateral side wall part 10 (i.e., battery-side connection part 11), so that the connectable electric equipment 21 can be stably mounted to (attached to) the upper end of the lateral side wall part 10 (i.e., battery-side connection part 11), while the connectable electric equipment 21 can be prevented from rotating relative to the body case 2 (i.e., battery-side connection part 11). The protrusions 24T of the electric equipment-side connection part 34 (the number of the protrusions 24T in FIG. 8 is 3, but can be any number such as 1, 2, or 4 or more) and the recesses 2B of the lateral side wall part 10 (i.e., battery-side connection part 11) to which the protrusions 24T are locked together form a rotation prevention mechanism that prevents the rotation of the battery-side terminal 9 and the equipment-side terminal 27 in a connection direction.

As shown in FIG. 4 to FIG. 8, the body part 24 of the electric equipment 23 includes a U-shaped frame portion 24A that protrudes radially outward from one place in the peripheral direction of the outer surface, and a locking part 28 that is attached to the frame portion 24A to be pivotally movable around a horizontal axis X on the lower end of the frame portion 24A. The locking part 28 is configured to come into locking engagement with the locked part 22A of 10) the relay member 22 in the state where the electric equipment 23 is mounted to the body case 2, to thereby prevent the electric equipment-side connection part 34 of the connectable electric equipment 21 from slipping out of the battery-side connection part 11 of the mobile battery device 1 via the relay member 22. Thereby, it is possible to prevent the damage of the electric equipment 23 due to the slipping out of the body case 2.

The locking part 28 is made of a synthetic resin (or can be made of, for example, wood or metal). As shown in FIG. 4 to FIG. 8, the locking part 28 is formed into a vertically elongated shape and has an upper side portion 28A, a lower side portion 28B, and a bent portion 28C. The upper side portion 28A is formed into a rectangular shape vertically elongated to enter the frame part 24A. The lower side portion 28B is located radially inward of the upper side portion 28A via the bent portion 28C that is bent radially inward, and extend straight downward therefrom. The lower side portion 28B has a claw 29 on the inner surface of the lower end.

As shown in FIG. 6, the claw 29 has an inclined surface 29*a* located radially inward as it advances upward from the lower end, a vertical surface 29*b* extending straight upward from the upper end of the inclined surface 29*a*, and a horizontal surface 29*c* extending radially outward from the upper end of the vertical surface 29*b*. The horizontal surface 29*c* comes into contact with a horizontal surface 22*c* of the locked part 22A, to thereby prevent the electric equipment 23 from moving in a direction (upward) to disengage from the body case 2. Further, a tongue piece 28*a* is integrally formed with a radially inner surface of the upper side portion 28A to serve as an urging part that comes into contact with the outer surface of the body part 24 to urge the upper side portion 28A to the side away from the body part 24A.

The tongue piece 28*a* extends to moderately curve so as to come close to the radially inner side as it advances upward from a substantially central portion in the vertical direction of the radially inner surface of the upper side portion 28A. In FIG. 5, the tongue piece 28*a* urges the locking part 28 to cause it to turn around the horizontal axis X (see FIG. 5) in anticlockwise direction. This urging force enables the claw 29 of the locking part 28 to be kept locked to the locked part 22A of the relay member 22. When the locking is to be released, the upper part of the locking part 28 is pressed radially inward to turn the claw 29 radially outward around the horizontal axis X. Thereby, the locking is released.

As shown in FIG. 5, the equipment part 25 includes a base plate 31 to which a plurality of light-emitting diodes 30 are fixed. The base plate 31 and the USB connector 27 are connected to each other with wire (not shown). Accordingly, when the connectable electric equipment 21 is mounted to the mobile battery device 1 via the relay member 22 with the USB connector 27 being connected to the second USB terminal 9, and the rotary switch 32 provided in the connectable electric equipment 21 (see FIG. 4) is in ON, the plurality of light-emitting diodes 30 light up. Thereby, the mobile battery device 1 and the connectable electric equipment 21 connected to each other can be used as a lighting instrument that is an example of the mobile electric device. When the light-emitting diodes 30 are to be turned out, the rotary switch 32 (see FIG. 4) is rotated, or the switch 15 is long pressed. Thereby, the light-emitting diodes 30 are turned OFF. In this embodiment, the lighting instrument (i.e., the mobile electric device) is formed by mounting the connectable electric equipment 21 to the mobile battery device 1, but the mobile electric device such as a flush device or an electric fan can be formed by mounting a flush, a fan, or the like to the mobile battery device 1.

Figure 4:
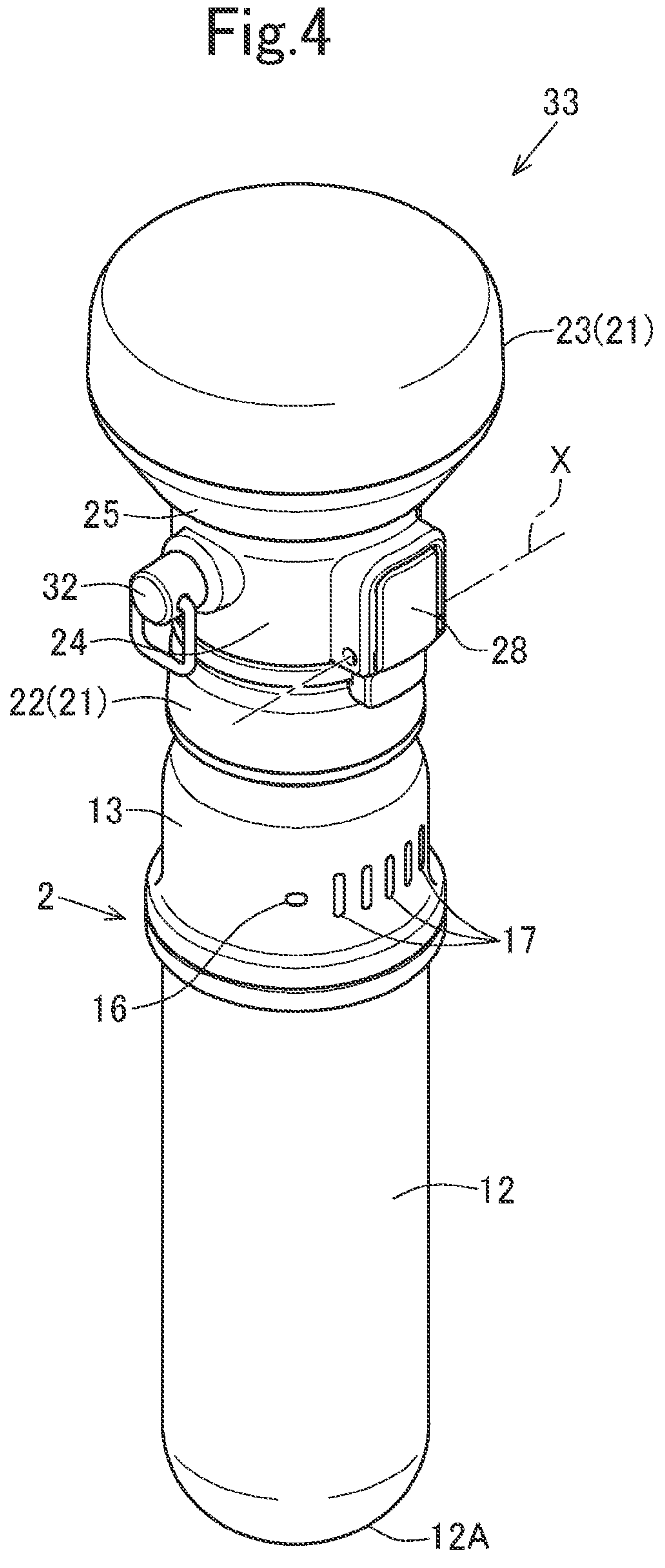
FIG. 4 is a perspective view of a mobile electric device when viewed from diagonally above.

In the case of forming the mobile electric device 33 shown in FIG. 4 from the state in FIG. 8, the relay member is first brought into threaded engagement with the threaded part 10N of the lateral side wall part 10 at the upper end of the body case 2, to cause the second seal member 20 to seal between the relay member 22 and the lateral side wall part 10. Subsequently, the USB connector 27 of the electric equipment 23 is connected to the second USB terminal 9 of the mobile battery device 1. At this time, the electric equipment-side connection part 34 of the connectable electric equipment 21 enters inside the relay member 22 to cause the first seal member 26 to seal between the electric equipment-side connection part 34 and the relay member 22. Simultaneously, the locking part 28 of the connectable electric equipment 21 is pressed to the locked part 22A of the relay member 22 in a direction in which the locking part 28 locks the locked part 22A of the relay member 22. Thereby, the connectable electric equipment 21 is prevented from slipping out of the mobile battery device 1, and water is prevented from entering between the connectable electric equipment 21 and the mobile battery device 1 by the first seal member 26 and the second seal member 20.

Accordingly, when the battery-side connection part 11 and the electric equipment-side connection part 34 are connected to each other via the relay member 22, the relaying battery-side slip-out prevention part 22N engages with the battery-side slip-out prevention part 10N, so that the battery-side connection part 11 can be prevented from slipping out of the relay member 22. Further, the electric equipment-side slip-out prevention part 28 engages with the relaying electric equipment-side slip-out prevention part 22A so that the relay member 22 prevents the connectable electric equipment 21 from slipping out of the mobile battery device 1. That is, the relay member 22 can prevent the battery-side connection part 11 from slipping out of the electric equipment-side connection part 34. Moreover, with the configuration having the electric equipment-side water-stop part 26 engaging or abutting with the relaying battery-side water-stop part (i.e., surface on the upper side of the inner surface 22*e* of the relay member 22), the penetration of water through a gap between the battery-side connection part 11 and the relay member 22 can be prevented. Further, the battery-side water-stop part 20 engages or abuts with the relaying electric equipment-side water-stop part (i.e., surface on the lower side of the inner surface 22*e* of the relay member 22) so that the penetration of water through a gap between the electric equipment-side connection part 34 and the relay member 22 can be prevented. That is, the relay member 22 can prevent the penetration of water from a gap between the battery-side connection part 11 and the electric equipment-side connection part 34. In this embodiment, it is a matter of course that the water-stop part prevents the penetration of not only water, but also dirt or dust.

The present invention is not limited to the aforementioned embodiment, and various modifications can be made without departing from the gist of the present invention.

According to the connectable electric equipment 21 of the aforementioned embodiment, the USB connector 27 of the electric equipment 23 is kept fixed to the electric equipment 23, while the present invention can be configured such that the USB connector 27 is connected to the electric equipment 23 with, for example, an extensible or retractable wiring to allow the USB connector 27 to be freely movable. According to this configuration, it is possible to prevent the breakage of the second USB terminal 9 because the USB connector 27 does not rotate even when the electric equipment 23 rotates in a state where the USB connector 27 is connected to the second USB terminal 9 of the body case 2. Accordingly, in this configuration, the relay member is omitted, and the electric equipment 23 and the body case 2 are provided with a water stop structure and a slip-out prevention structure to prevent the penetration of water and the slip-out in a state where the electric equipment 23 is mounted to the body case 2.

Also in this embodiment, the electric equipment 23 includes the rotary switch 32, but can include a push-button switch instead. Further, the mobile electric device 33 can be configured such that the operation and non-operation of the electric equipment 23 can be switched by ON/OFF of a switch on the body case 2 side, while the rotary switch 32 of the electric equipment 23 is omitted.

Further, the mobile battery device of the aforementioned embodiment houses one secondary battery 5, but can be configured to house any number, such as two or more secondary batteries. In this case, the shape and size of the body case 2 for housing two or more secondary batteries are changed.

Further, although the mobile battery device 1 of the aforementioned embodiment includes an input terminal (i.e., power receiving terminal) to receive power for charging the secondary battery, it can be configured to omit the input terminal. In this case, the body case is configured to allow a non-rechargeable battery to be detachably mounted to the body case, in which the battery with the remaining battery capacity being eliminated or reduced is removed from the body case, and a new battery is mounted to the body case.

In order to describe the present invention, the present invention is appropriately and sufficiently explained through the embodiment with reference to the drawings in the above description. However, it should be recognized that the revision and/or modification of the aforementioned embodiment can be easily achieved by those skilled in the art. Accordingly, the revised form or the modified form carried out by those skilled in the art is interpreted to be included in the scope of the claimed invention as long as the revised form or the modified form is not located at the level departing the scope of the claimed invention described in the claims.

REFERENCE SIGNS LIST

1: Mobile battery device
2: Body case
2A: Opening
2B: Recess
2K: Housing space
2*a*, 2*b*: Opening
3: Cap part
4: Coupling member
4A, 4B: Hole
5: Secondary battery
6: Cover member
6A: Hole
7: Protection case
8: First USB terminal
9: Second USB terminal (battery-side terminal)
10: Lateral side wall part
10F: Flange
10M: Groove
10N: Threaded part (battery-side slip-out prevention part)
11: Battery-side connection part
12: First case part
13: Second case part
12A: Bottom part
12B: Opening part
12N: Screw hole
14: Seal member
15: Switch
16: Power lamp
17: Indicator
18: Top part
18A: Locking part
18*a*: Shaft part
18*b*: Large diameter part
19: Skirt part
19N: Threaded part
20: Seal member (Second seal member, battery-side water-stop part)
21: Connecting electric equipment
22: Relay member
22*e*: Inner surface
22A: Locked part (relaying electric equipment-side slip-out prevention part)
22N: Threaded part (relaying battery-side slip-out prevention part)
22*a*: Inclined surface
22*b*: Flat surface
22*c*: Horizontal surface
23: Electric equipment
24: Body part
24A: Frame portion
24M: Groove
24T: Protrusion
25: Equipment part
26: Seal member (first seal member, electric equipment-side water-stop part)
27: USB connector (equipment-side terminal)

28: Locking part (electric equipment-side slip-out prevention part)
28A: Upper side portion
28B: Lower side portion
28C: Bent portion
28A: Tongue piece
29: Claw
29A: Inclined surface
29*a*: Inclined surface
29*b*: Vertical surface
29*c*: Horizontal surface
30: Light-emitting diode
31: Base plate
32: Rotary switch
33: Mobile electric device
34: Electric equipment-side connection part
X: Horizontal axis

The invention claimed is:

1. A mobile battery device comprising a body case having a housing space for housing a battery, the body case comprising, at certain places:

a battery-side terminal that serves as an output terminal of the battery; and a battery-side connection part that is connectable to an electric equipment-side connection part of an electric equipment that is configured to operate by receiving power of the battery, the electric equipment-side connection part comprising an equipment-side terminal that is electrically connectable to the battery-side terminal, the battery-side connection part is connected to the electric equipment-side connection part via a relay member, the battery-side connection part comprising:

a lateral side wall part having an outer surface and an upper end;

a battery-side slip-out prevention part provided on the outer surface of the lateral side wall part and configured for forming a slip-out prevention structure at a connection portion between the battery-side connection part and the relay member; and a battery-side water-stop part provided on the outer surface of the lateral side wall part and configured for forming a water stop structure at the connection portion between the battery-side connection part and the relay member, wherein the battery-side terminal is provided on the upper end of the lateral side wall part to allow the equipment-side terminal to be connected to the battery-side connection part from above, the relay member is a cylindrical member separate from the mobile battery device and the electric equipment, the relay member has an inner side surface, an inner threaded part provided on the inner side surface, and an annular-shaped recess formed on the outer surface, the battery-side connection part is fitted into the relay member, the inner threaded part of the relay member engages with the battery-side slip-out prevention part, a seal member as the battery-side water-stop part abuts with the inner side surface of the relay member to thereby form inside the relay member a water stop structure between the relay member and the battery-side water-stop part, and the battery-side connection part is fitted into the relay member to form slip-out prevention by the battery-side slip-out prevention part and water stop by the battery-side water-stop part.

2. A connectable electric equipment comprising an electric equipment that is connectable to a mobile battery device housing a battery and that operates by receiving power of the battery, the electric equipment comprising, at a certain place, an electric equipment-side connection part, wherein the electric equipment-side connection part is connectable to a battery-side connection part of the mobile battery device, the electric equipment-side connection part comprises an electric equipment-side terminal that is electrically connectable via a relay member to a battery-side terminal that serves as an output terminal of the battery of the battery-side connection part, and the electric equipment-side connection part comprises:

an electric equipment-side slip-out prevention part for forming a slip-out prevention structure at a connection portion between the electric equipment-side connection part and the relay member; and an electric equipment-side water-stop part for forming a water stop structure at the connection portion between the electric equipment-side connection part and the relay member, wherein the relay member is a cylindrical member separate from the mobile battery device and the electric equipment, the relay member has an inner side surface, an inner threaded part provided on the inner side surface, and an annular-shaped recess formed on an outer surface, the annular-shaped recess of the relay member engages with the electric equipment-side slip-out prevention part of the electric equipment, a seal member as the electric equipment-side water-stop part abuts with the inner side surface of the relay member to thereby form inside the relay member a water stop structure between the relay member and the electric equipment-side water-stop part, and the electric equipment-side connection part is fitted into the relay member to form slip-out prevention by the electric equipment-side slip-out prevention part and water stop by the electric equipment-side water-stop part.

3. A mobile electric device comprising:

a mobile battery device comprising a body case having a housing space for housing a battery; and a connectable electric equipment comprising an electric equipment that is connectable to the mobile battery device and operates by receiving power of the battery, wherein the body case of the mobile battery device comprises, at certain places, a battery-side terminal that serves as an output terminal of the battery, and a battery-side connection part, the electric equipment of the connectable electric equipment comprises, at a certain place, an electric equipment-side connection part comprising an electric equipment-side terminal that is electrically connectable to the battery-side terminal, a relay member is provided for connecting between the battery-side connection part of the mobile electric device and the electric equipment-side connection part of the electric equipment, the battery-side connection part comprises:

a lateral side wall part having an outer surface and an upper end;

a battery-side slip-out prevention part that is provided on the outer surface of the lateral side wall part and is configured to be connectable to the relay member and forms a slip-out prevention structure at a connection portion between the battery-side connection part and the relay member; and a battery-side water-stop part that is provided on the outer surface of the lateral side wall part and is configured to form a water stop structure at the connection portion between the battery-side connection part and the relay member, the battery-side terminal is provided on the upper end of the lateral side wall part to allow the electric equipment-side terminal to be connected to the battery-side connection part from above, and the electric equipment-side connection part comprises:

an electric equipment-side slip-out prevention part that is connectable to the relay member and is configured to form the slip-out prevention structure at a connection portion between the electric equipment-side connection part and the relay member;

an electric equipment-side water-stop part for forming the water stop structure at the connection portion between the electric equipment-side connection part and the relay member, wherein the relay member is a cylindrical member separate from the mobile battery device and the electric equipment, the relay member has an inner side surface, an inner threaded part provided on the inner side surface, and an annular-shaped recess formed on the outer surface, the inner threaded part of the relay member engages with the battery-side slip-out prevention part, the annular-shaped recess of the relay member engages with the electric equipment-side slip-out prevention part of the electric equipment, a seal member as the battery-side water-stop part abuts with the inner side surface of the relay member and abuts with a seal member as the electric equipment-side water-stop part to thereby form inside the relay member a water stop structure between the relay member and the battery-side water-stop part, and a water stop structure between the relay member and the electric equipment-side water-stop part, and the electric equipment-side connection part is fitted into the relay member to form slip-out prevention by the battery-side slip-out prevention part and water stop by the battery-side water-stop part.

* * * * *